United States Patent [19]

Svyatsky

[11] Patent Number: 4,892,300
[45] Date of Patent: Jan. 9, 1990

[54] DIFFERENTIAL DOCUMENT DRIVE
[75] Inventor: Eduard Svyatsky, Chicago, Ill.
[73] Assignee: Bell & Howell Company, Chicago, Ill.
[21] Appl. No.: 198,472
[22] Filed: May 25, 1988
[51] Int. Cl.⁴ .............................................. B65H 5/02
[52] U.S. Cl. ..................................... 271/225; 271/227; 271/236; 271/250
[58] Field of Search ............... 271/225, 227, 236, 238, 271/250

[56] References Cited

U.S. PATENT DOCUMENTS

| | | | |
|---|---|---|---|
| 3,713,647 | 1/1973 | Tamura | 271/250 X |
| 3,917,258 | 11/1975 | Miller | 271/225 X |
| 3,952,874 | 4/1976 | Owen | 271/225 X |
| 4,092,022 | 5/1978 | Preuss | 271/236 |
| 4,109,595 | 8/1978 | Ducol | 271/225 X |
| 4,268,022 | 5/1981 | Looney | 271/225 X |
| 4,362,298 | 12/1982 | Steffansson | 271/236 |
| 4,483,530 | 11/1984 | Spencer | 271/227 X |
| 4,669,718 | 6/1987 | Rovin | 271/227 |

Primary Examiner—Richard A. Schacher
Attorney, Agent, or Firm—Laff, Whitesel, Conte & Saret

[57] ABSTRACT

A differential motion translating and document drive delivery system wherein the system includes power, a first element for delivery of documents sequentially along a first path, a device for establishing orientation relative to a planar reference, and an element related to the first delivery element for translating the direction of movement of the documents angularly relative to the first path along a second path, the paths being generally perpendicular and hence the second path is substantially parallel relative to the reference.

30 Claims, 6 Drawing Sheets

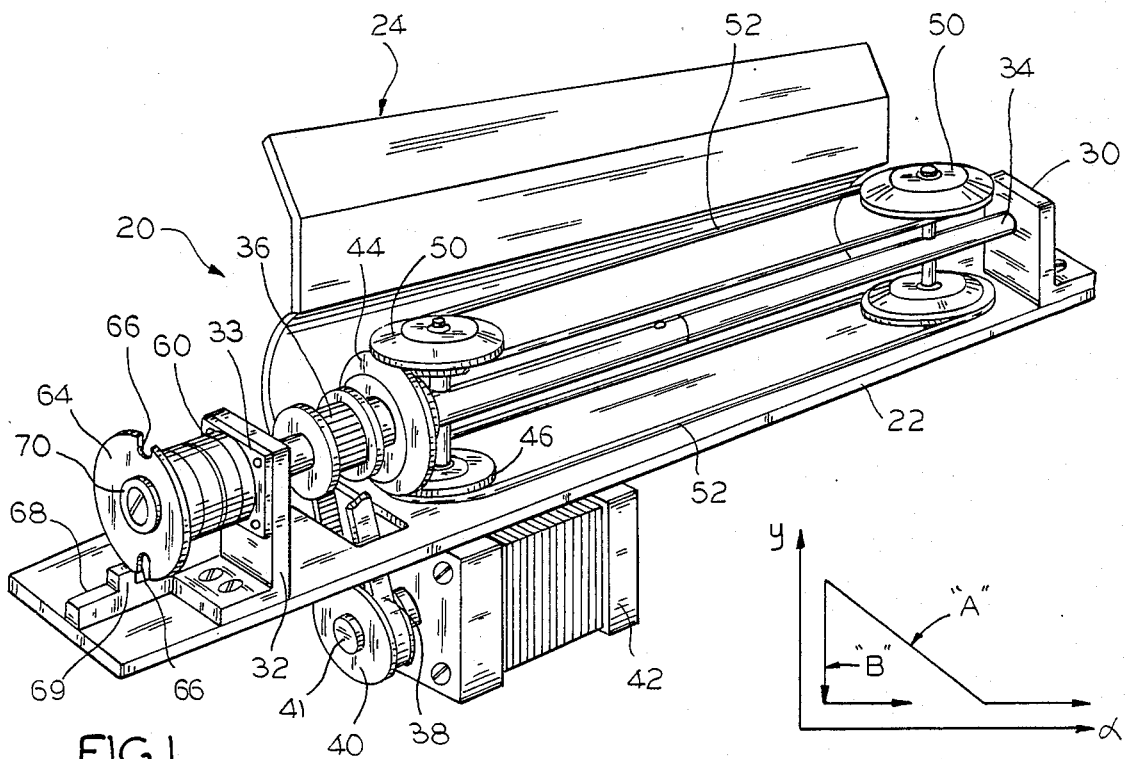
FIG.1
FIG.1A
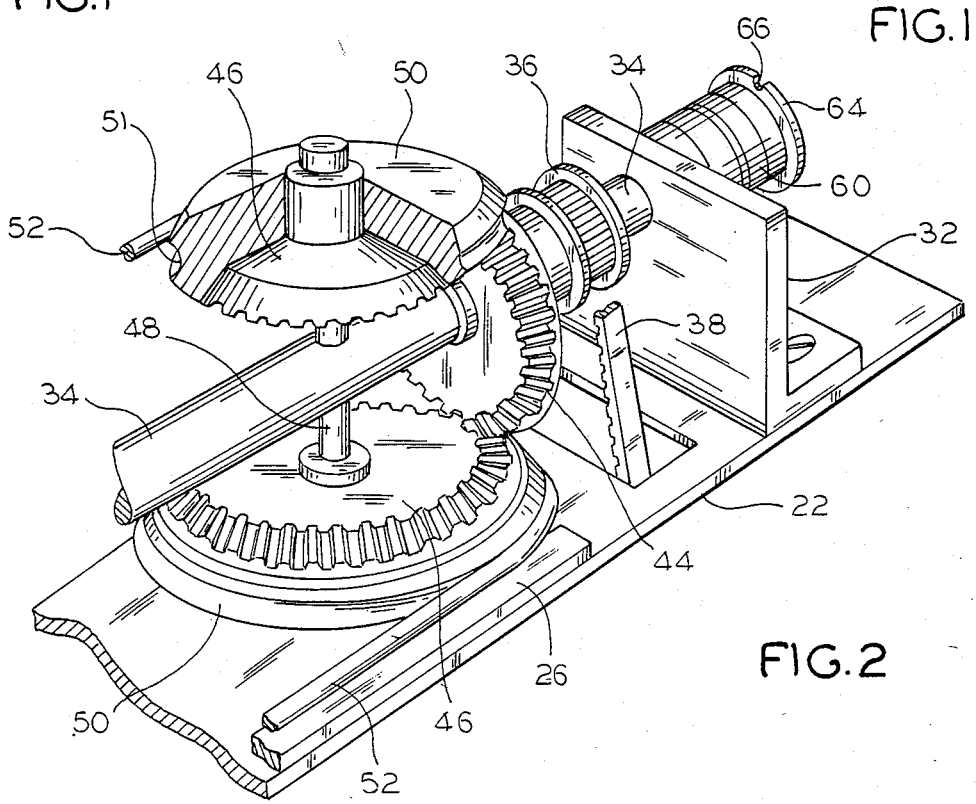
FIG.2

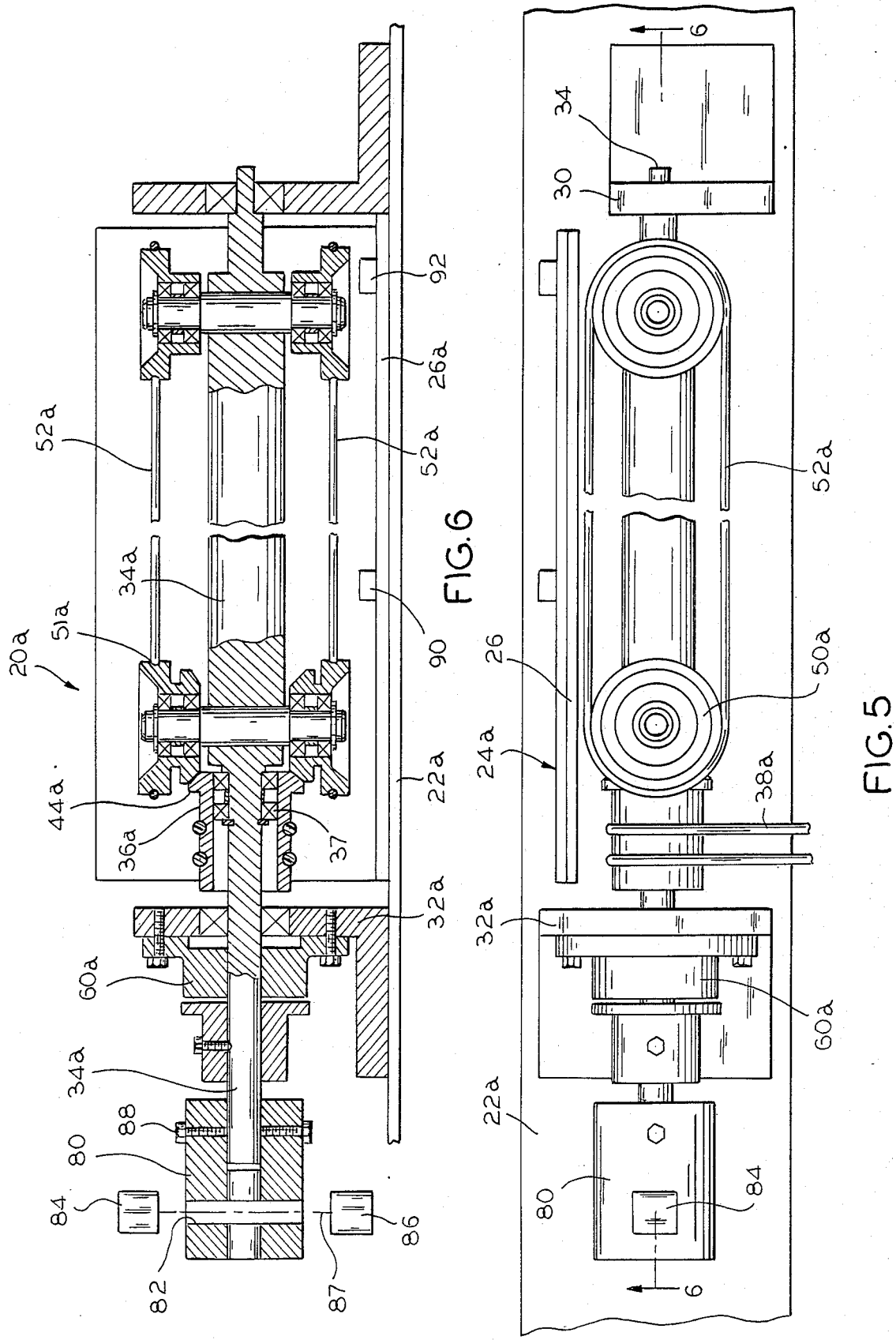

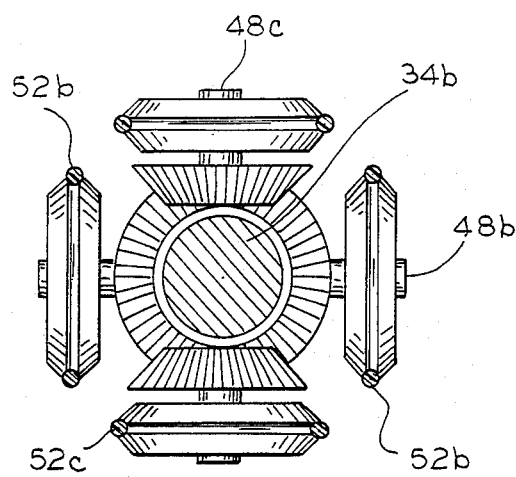
FIG.9
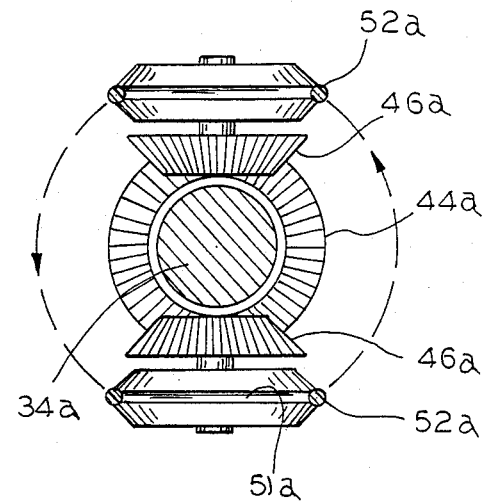
FIG.7
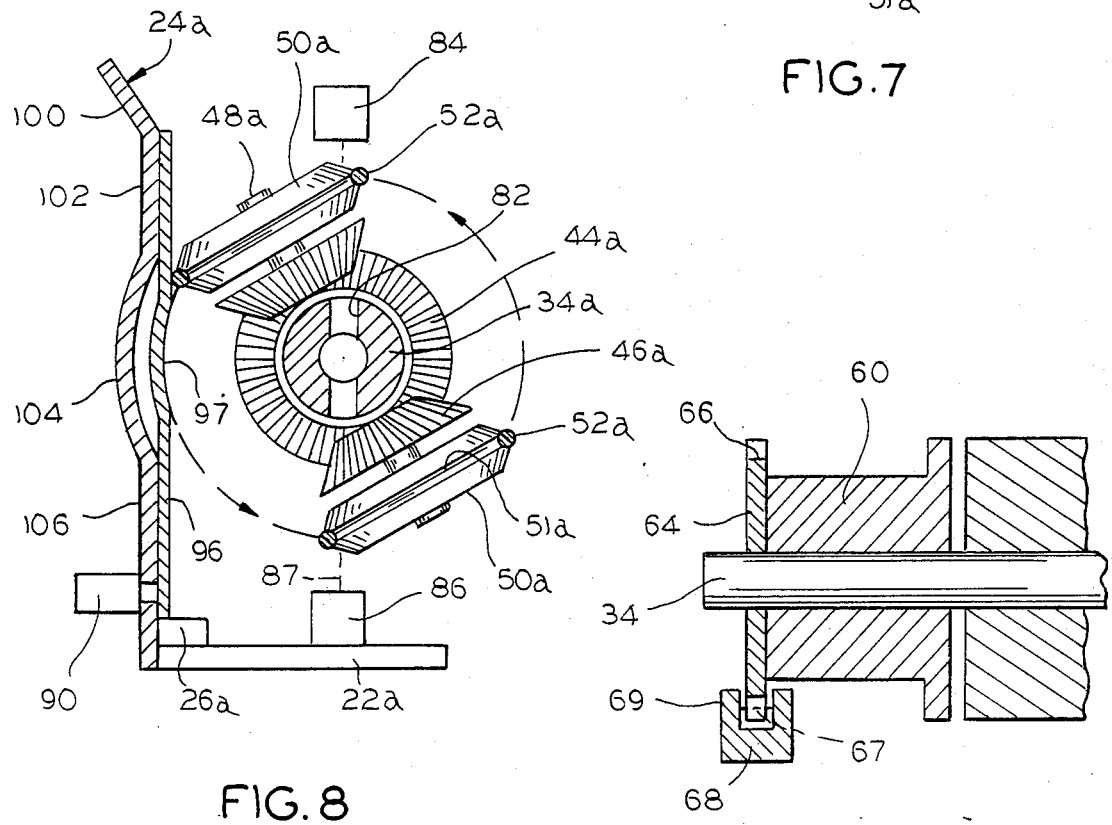
FIG.8
FIG.10

DIFFERENTIAL DOCUMENT DRIVE

BACKGROUND OF THE INVENTION

The invention relates to methods and apparatus for aligning, by one edge, sheets of material, such as paper and the line, or checks, billing stubs and other documents. The subject invention also relates to document or sheet transporters and processing systems. More specifically it can be utilized at the loading station for a check processing device as well as other document feed mechanisms.

In the field of prior art, the devices that relate to this technology, usually involve inclined rollers. In those devices, a multi-wheel document drive is utilized and the movement of paper is always at an angle therefore they require a loading station longer than the longest dimension of the document. Generally, they need a plurality or line of rollers. These are complicated mechanisms that utilize small rollers, require constant adjustment, make it difficult to work with mixed media, i.e. different textures of paper and sizes of paper and also depend on the rigidity of the paper. Other prior art devices have a different combination of rollers but at least one roller is always inclined at some time in order to move the paper downwardly to a reference plane.

In these prior art devices when the paper hits the bottom, or, reference plane, it stops its vertical motion and the inclined rollers generally walk on the paper and pivot up so that the rollers assume a horizontal disposition and thereby drives the paper out of the station in a sideways direction. Such devices raise several problems namely, the paper is still initially driven to the reference plane at an angle and, therefore, requires a larger space than the major horizontal dimension of any document contemplated to be used in the device. It also requires a contact force as well as other criteria of contact that is critical to its operation. How to contact paper, but not provide support behind the paper, or else the wheel will not freely drop down or pivot to its inclined initial position after the paper leaves. This requires very critical spacing adjustment. When mixed media are utilized and where you are using six rollers, it is almost impossible to provide a means of ready adjustment to accept different forms of media.

A further problem is that paper has a tendency to buckle when held by a gate means at one end of the station and this can cause jams. Often, such buckling is caused by contacting the paper solely at very small points rather than over a larger area, which is generally due to the small size of the rollers.

Devices of the type known as the prior art can be generally found in various U.S. patents, such as U.S. Pat. No. 1,987,339 to R. Hitchcock; U.S. Pat. No. 2,767,982 to A. W. Noon; U.S. Pat. No. 2,819,078 to R. A. Durand; U.S. Pat. No. 2,888,261 to M. M. Barnes; U.S. Pat. No. 3,107,089 to K. L. Lockey; U.S. Pat. No. 3,614,091 to F. Bernardis; U.S. Pat. No. 4,072,305 to K. Scheid, et al.; and lastly U.S. Pat. No. 4,362,298 to R. Stefansson (assigned to the assignee of the present invention).

SUMMARY OF THE INVENTION

It is a general object of this invention to overcome the disadvantages and meet the needs expressed or implicit in the requirements of solving the problems found in the devices mentioned above. Therefore, it was necessary to establish parameters for the mechanism contemplated by this invention, namely, a mechanism which will move paper vertically to a bottom reference plane or support, not at an angle, and thence horizontally along said plane. This allows shortening the length of the loading station to the size of the biggest document contemplated to be accomodated.

A further object is to establish a mechanism which does not require multiple adjustments and also has a minimal amount of overall adjustment necessary. Another object is to control the paper over a large line of surface rather than at a single point as it was done with the small wheels in the prior art devices. Thus by overcoming the various problems, it is a major object of the invention to provide an improved sheet aligning method and apparatus as well as to improve the lateral transportation of the sheet out of the apparatus.

The present invention resides in the method and apparatus for transporting a sheet in a first direction toward a reference plane and thence translating the direction of movement of said documents angularly relative to said first path along a second path with the paths being generally perpendicular and hence parallel relative to said reference.

To provide such a functional relationship the present invention relates to a planetary-type mechanism having a central shaft carrying at least one sun gear, a planet carrier that can be braked relative to said shaft and at least two planet gears carrying pulley means with each having their axis generally perpendicular to said shaft and adapted to accept a continuous flexible band for movement in concert with said planet pulleys. A clutch is also provided to control the rotation of the planet carriers relative to the shaft axis. When the central shaft freely rotates, the entire unit rotates about the axis of the central shaft as a single unit. When the planet carrier is braked to a fixed position, the rotating sun gear drives the planet gears and their carried pulleys causing a linear movement of the continuous belts mounted thereon. The clutch member cooperates with sensing means so that the shaft will always stop at 180° increments in substantially the same position. The planet carrier stops 5°-10° off of the vertical center line since the bottom set of belts runs in an opposite direction from the upper set of belts due to the planetary mechanism and the angular disposition keeps the bottom belt away from the paper and the paper is not then subjected to opposite direction forces.

Release of the clutch permits free rotation of the entire unit with the central shaft about its axis whereby the individual belts each sequentially engage the paper and pull the documents down until they reach a reference plane. During this phase the belts are substantially fixed and do not rotate on the pulleys. When the paper or document reaches the reference plane, it blocks at least one sensor. A signal from the at least one sensor is sent to a second sensor which creates a signal when the angular disposition of the planet carrier reaches a predetermined point. The second sensor then sends a signal to actuate the clutch. The central shaft stops when the clutch is activated by this last mentioned sensor and hence the pulleys carried by the planet gears start the belts to rotate horizontally in an instantaneous fashion and the document is then driven horizontally out of the station. When the document clears the first mentioned sensor, a signal is sent to deactivate the clutch and the shaft starts to rotate again causing the entire device to rotate an "α" unit and to accept and deliver the next document in a substantially vertical relationship with no angle relative to the vertical as is found in the prior art.

BRIEF DESCRIPTION OF THE DRAWINGS

The subject invention and its various objects will become more readily apparent from the following detailed descriptions of the preferred embodiments which are illustrated, by way of example, in the accompanying drawings wherein similar numerals designate similar parts and in which:

FIG. 1 is a perspective view of a device embodying principals of the present invention;

FIG. 1A is a graph illustrating the x and y components of the prior art when compared to the present invention;

FIG. 2 is a partial perspective view in partial section taken from the backside of the device shown in FIG. 1 but with the paper support means eliminated for purposes of clarity in illustration;

FIG. 5 is a plan view of another embodiment of the present invention;

FIG. 6 is a side elevational view taken along line 6—6 of FIG. 3;

FIG. 7 relates to a partial sectional view of the planetary mechanism, pulleys and belts of at least one end of the device shown in FIG. 1;

FIG. 8 is a partial cross-sectional view adjacent one end of the planetary mechanism and sensing means of a device of the type shown in FIGS. 5 and 6 with the paper and back up panel also shown in section;

FIG. 9 is still another embodiment of the present invention showing a plurality of at least two planet carrier mechanisms disposed at right angles relative to on another;

FIG. 10 is a partial schematic side cross-sectional elevation of a sensing means and clutch relative to the structure and shaft shown in FIGS. 1 and 2;

DETAILED DESCRIPTION

Figure 3:
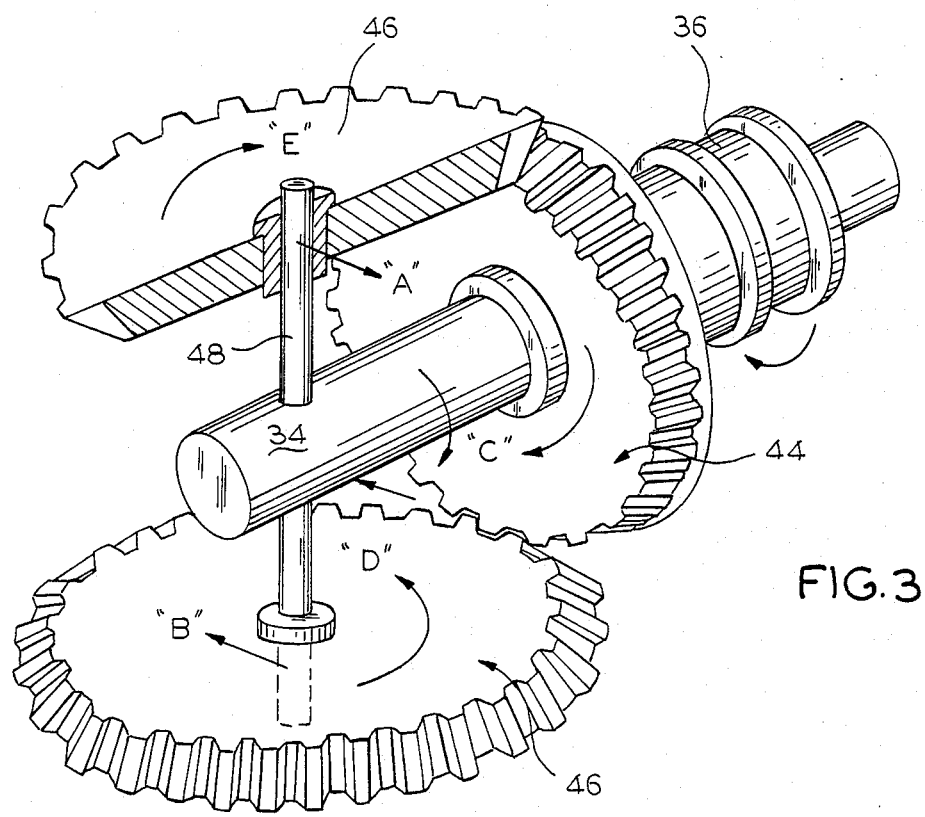
FIG. 3 is an enlarged perspective view in partial section of the shaft, sun gear and one of the planetary carriers and the planet gears associated therewith.

The differential motion translating and document drive delivery system 20, shown in FIGS. 1–4 and 10 has a base 22 and a sheet support surface 24 extending upwardly from the base 22 and terminating at the base by a registration edge or reference plane bar 26 attached to the base 22.

The objective of the apparatus shown in the drawings is to transport a sheet first toward and then along the planar bar 26 with the same paper drive means being used for both functions. In the prior art, one or more movable wheels was utilized to accomplish this with the wheels being first disposed in an angular fashion relative to a base or registration edge and then being translated to a horizontal position for delivery of the sheet or document laterally to a secondary station in a predetermined aligned position. This angular disposition of the wheels resulted in the necessity for a long carriage since there was a lateral movement of the sheet or envelope prior to contacting the registration edge and thence its movement. This can be best seen in FIG. 1A where the prior art is designated by the graph line designated by the letter "A". In the present invention, it is the intent that the document be moved perpendicular to the registration edge 26 and thence followed it in the pattern shown by the graph line "B". By following a path shown by "B", it is possible to forshorten the necessary length given to the alignment and transport apparatus 20 since there is no angular portion as there is in the line "A".

Rather than utilizing one or more translatable wheels, the present invention uses a pair of supports 30 and 32 provided with suitable bearing means for supporting an elongated shaft 34. Freely mounted for rotation on the shaft 34 is a power take off means or pulley 36 which in this case is provided with axially extending serrations to accept a positive drive belt 38. The belt 38 is then passed over a second revolving pulley 40 that is connected to the shaft 41 of a power source such as motor 42.

The first power pulley 36 is keyed or otherwise suitably fixed to a sun gear 44 with pulley 36 and gear 44 being constantly rotating about shaft 34 as long as power is supplied by the motor 42. Therefore, it will be obvious that the power train is created by the pulley 40, belt 38 and pulley 36 along with the sun gear 44 freely rotate on the shaft 34. The gear 44 engages a pair of planetary gears 46 which are disposed at opposite ends of an idler shaft 48 fixed perpendicular to shaft 34. In this embodiment, each of the gears 46 are fixed relative to a sheave 50 having an external groove 51 for accepting an elongated belt 52. In the present embodiment the belt 52 is circular in cross section. Before proceeding with further description of the operation of the device, it is necessary to indicate that at one end of the shaft 34, as best seen at the left-hand end of FIG. 1 there is provided an electromagnetic clutch 60 which will and is capable of stopping the shaft 34 at predetermined angularly disposed points. At the extreme end of shaft 34 there is a serrated or interrupted disk 64 having at least one slot 66, in the illustrated embodiment a pair of slots 66 are disposed angularly relative to one another, and with the disk 64 and the slot 66 passing through an interrupted sensing means, such as a light beam, in the detector means 68. While the detector means 68 is shown schematically as a device being slotted to accept the disk 64 it should be recognized that one portion 69, extending upwardly therefrom, provides either a light source or a receptor from the second upstanding portion by forming a spaced slot through which the disk 64 acts as an interrupter means except in the presence of the slots 66 extending inwardly from the edge of disk 64. The use of this interrupted means will be described hereinafter. The disk can be selectively angularly positioned at the end of shaft 34 by a washer and screw combination 70.

Figure 4:
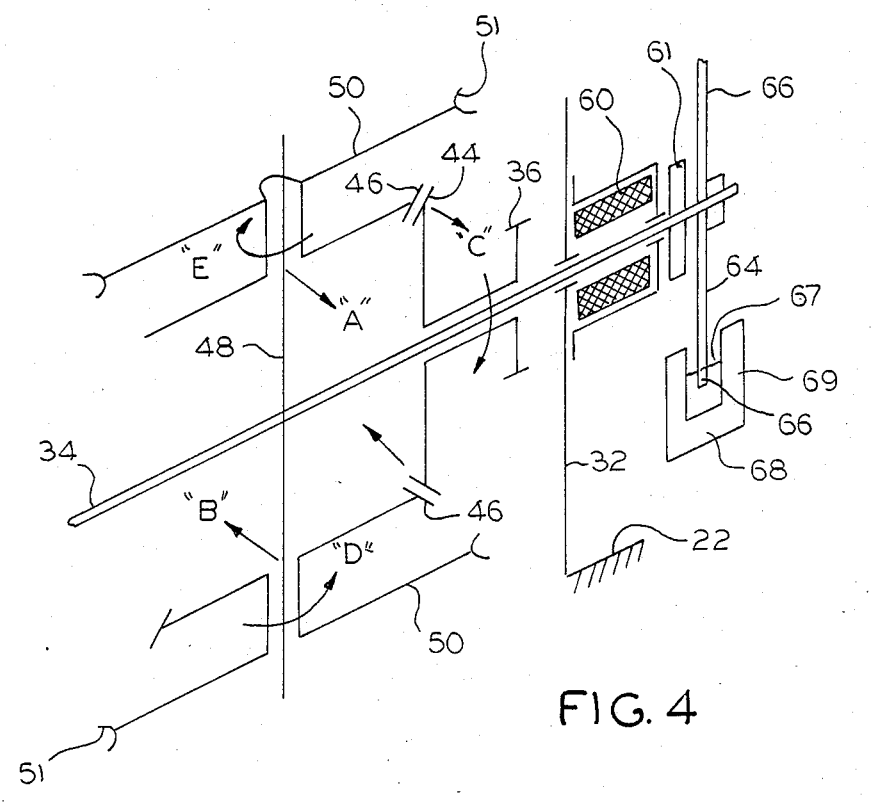
FIG. 4 is a schematic diagram of the device shown in FIG. 3 with the schematic addition of the clutch and sensing mechanism of the device shown in FIG. 1.

Referring now to FIGS. 3 and 4, the kinematics of this device are generally pictorially provided in FIG. 3 as well as in the schematic in FIG. 4. The shaft 34 will normally rotate when power is applied to the pulley 36 and the gear 44. If the shaft is not restricted by the electromagnetic means 60, the tendency is for a force A and B, as shown by the arrows at opposite ends of the idler shaft 48 cause that shaft to rotate the main shaft 34 by the gears 46 merely remaining in a predetermined position on gear 44 and riding with it around the axis of shaft 34. This causes the belts 51 to follow and define a generally cylindrical path and to thereby engage documents supported b the rear wall 24. The specific preferred construction of wall 24 will be discussed hereinafter, however, let it be seen that the belts 51 will as they rotate about the axis of shaft 34 cause their elongated line contact to draw any documents from an upper to a lower position where they are brought into contact with the reference edge 26. Sensing means are disposed in space relation along back wall 24 but adjacent the reference edge 26 whereby a signal is sent indicating that a document is in position. The signal is received by the detection means 68 with its light transmittable means 67 eminating from the upright portion 69. The disk 64 cuts this signal except when a slot 66 indicates a predetermined angular orientation of the shaft 34. When this occurs, a signal is sent from detector 68 to the electromagnetic means 60 to lock the shaft in that predetermined orientation. Locking of the shaft 34 results in the pulley 36 to rotate relative to the shaft 34 rather than in the prior mutual or synchronous rotary movement. This rotation of the pulley 36 causes the sun gear 44 to also rotate, as indicated at "C", about shaft 34 and with the shaft 34 being fixed the idler shaft 48 is also fixed relative to the shaft 34 axis and does not rotate, and not as indicated by the force arrows A and B. Rather, the fixation of the idler shaft 48 causes the planet gears 46 to rotate (as indicated by the arrows "D" and "E") as the sun gear is also rotated. This differential action rotates the attached pulleys 50 (not shown for clarity and illustration in FIG. 3) and thereby moving the belts 52 in the appropriate grooves 51. Movements of the belts around the idler shaft causes one of them to move the document along the reference edge 26 as generally shown by the graph line "B" shown in FIG. IA. As will be appreciated, the drawings show the idler shaft in a perpendicular position relative to the base 22, for clarity in illustration, however, it should be noted that when shaft 34 is fixed against rotation the idler shafts 48 are not disposed perpendicular to the base since it is desirous to bring only one of the belts 52 into contact with the documents and hence an angular disposition of idler shaft 48 is carried out by appropriate orientation of the disk 34 and its opposed slots 66. In this first embodiment, the angular sensing means is disk 64 with its angularly circumferentially spaced slot 66 that passed through a detector means 68. A schematic cross section in partial section of such a device is shown in FIG. 10.

Referring now to FIGS. 5-8 wherein similar parts are designated by similar numerals with the addition of the suffix "a", another embodiment of the present invention has basically the same parts as the first embodiment with a few modifications. While the device is substantially functionally identical, the detector means, instead of the interrupted disk 64, includes a generally cylindrical body means 80 disposed at the end of the shaft 34a with the cylindrical body 80 having a through bore 82 that extends through the axis of shaft 34a and permits a detector means 84-86 to pass its sensing means, such as light beam 87, through the bore 82 and thereby determine the angular orientation of the shaft 34a. This orientation can be adjusted by suitable set screw means 88. In the first embodiment, the sun gear 44 was keyed to a separate pulley 36. In the present embodiment, the sun gear is formed on a pulley 36a and made a substantially integral part thereof with suitable bearing means 37 permitting rotation about shaft 34a. While a serrated positive drive belt was used in the first embodiment, this particular embodiment utilizes a pair of round O-ring type belts 38a.

As best seen in FIGS. 7 and 8, when the shaft 34a is free to rotate it carries the planetary gears 46a along with the sun gear 44a rotating about the axis of shaft 34a in a unitary or synchronous fashion. When a signal is developed by the sensors 90-92 indicating the presence of a document 96 the sensors 84, 86 determine the orientation of the bore 82 and send a signal to the electromagnetic means 60a which causes the shaft 34a to cease rotation and the planetary gears 36a to commence rotation about the idler shafts 48a, as sun gear 44a rotates about shaft 34a, thereby moving the belts 52a around the pulleys 50a attached to the planetary gears 46a.

Since it is necessary for the document 96a to be positioned in such a fashion that the belts 52a will engage and have a coefficient friction adequate to move the envelope along the reference edge 26a the back wall 24a has a unique configuration. As best seen in FIG. 8, back wall 24a has an angularly disposed lead-in portion 100, a vertical portion 102, a concave recess portion 104 and a vertical portion 106 which leads into and backs up the planar reference edge 26a. This configuration permits a sheet or envelope 96 to move down the incline 100, along the vertical portion 102 and then when the drive mechanism 20 is revolving about the axis of shaft 34a it permits the belt 52a and the pulleys 50a to depress the envelope or sheet 96 into the concavity of the wall 104. This is shown as position 97 where the envelope is depressed. As was previously mentioned, the relationship of the shaft bore 82 and the drive belts 52a is an angular relationship relative to the perpendicular to the base 22a. The reason for this is of course to permit the belt 52a to have a good coefficient or friction and engagement with the document 96. When it is in the vertical disposition, it will be appreciated that the belt 52a on the upper pulley 50a and the belt on the lower pulley 50a would cause a confusing signal to be given to the document 96 in the sense that those two belts are operating in opposite directions on the same side of the axis of the shaft 34a due to the differential movement of the sun gear 44a and the planetary gears 46a. Therefore, this angular disposition is necessary.

Conversely, it is possible, if desired to provide a multiple bore arrangement where the detectors 84 and 86 permit either the top or the bottom belt to become in contact with the document 96. For example, it may be desireable in certain circumstances to deliver a document 96 out one end and then alternatively in the second instance to engage with the lower belt and shoot it out the opposite end. A variation on this theme can be seen in FIG. 9 in which two idler shafts 48b and 48c are provided which thereby permit a smaller increment of movement of the main shaft 34b since less angular rotation is necessary in order to bring a belt 52b or 52c into engagement with the document.

Figure 11:
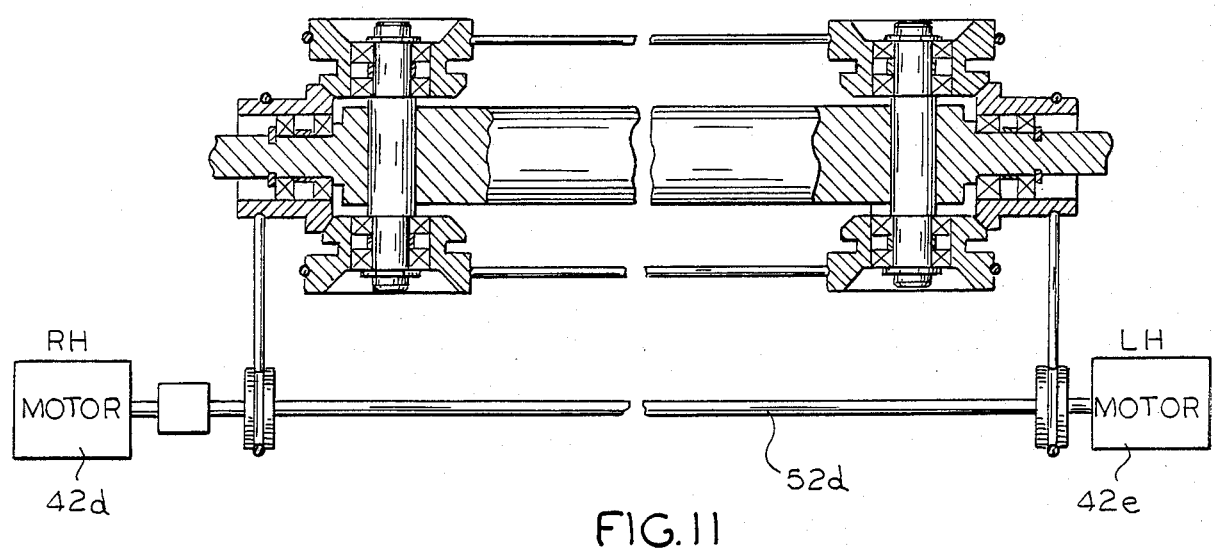
FIG. 11 is a further device embodying the use of two sun gears and a motor at each end of the shaft.

FIG. 11 is a variation and a further embodiment on which the primary motor 42d is a right hand motor and is of constant speed whereas the motor 42e connected to the opposite end is a left hand motor of variable speed and designated by the numeral 42e. By adding a second motor of an opposite hand to this device, it will add additional power. Additionally by having a variable speed left hand motor, it is possible to better control the speed of the belts 52d by imposing a braking power, if you will, with the variable speed motor 42e.

Figure 12:
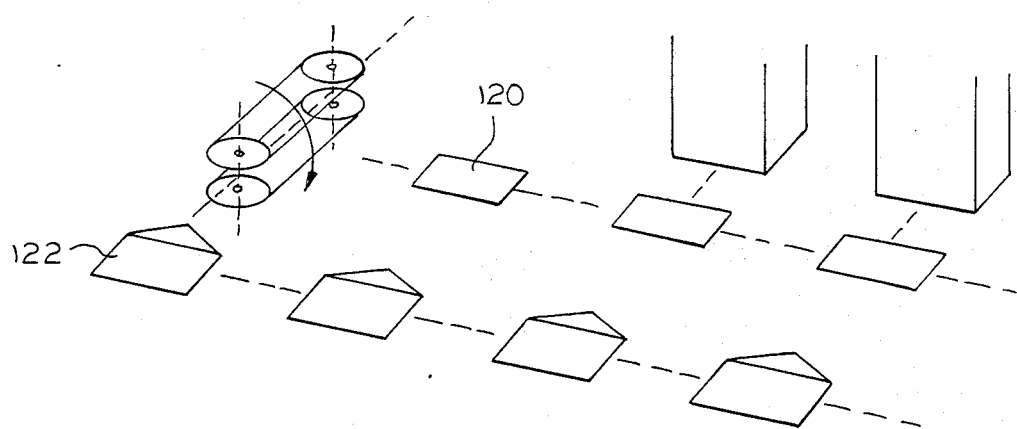
FIG. 12 is a schematic view of a secondary use for the present invention.
Figure 13:
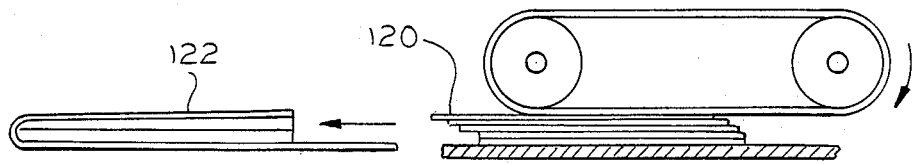
FIG. 13 is a side view of the invention being used in the secondary use shown in FIG. 12.

By appropriate gearing and by using a single planetary gear at opposite idler shafts at the opposite ends of the main shafts, it is possible to obtain both belts going in the same direction. FIGS. 12 and 13 show the use of such device where it is turned on edge with the idler shafts being in a horizontal disposition and can be used for stuffing stacks of documents into open envelopes as illustrated in FIG. 13 where the stacks 120 are fed individually until completed into the open envelope 122.

Figure 14:
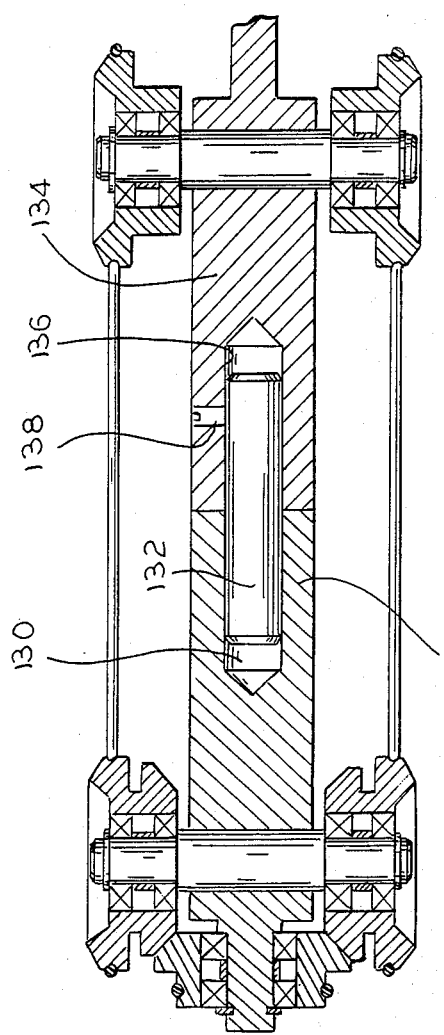
FIG. 14 is a side elevational view and partial section of an additional embodiment of the present invention wherein the main shaft is split and rotatable about a joining pin whereby the spindles for the pulleys can be angularly disposed relative to one another.
Figure 15:
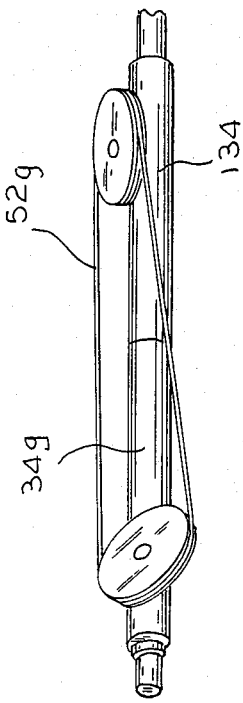
FIG. 15 is a partial perspective view showing the upper two pulleys in the disposition that would result when the sections of the shaft are rotated clockwise relative to each other.

Still another embodiment of the present invention is shown in FIGS. 14 and 15 where the main shaft 34g is provided with a bore 130 to accept a force fit to a pin 132. The second half of the split shaft 134 has a bore 136 that will accept the pin 132 loosely therein but which can be fixed to the pin by a set screw 138. What this accomplishes is that it is possible to take the second half of the shaft 134 and to rotate it angularly relative to 34g. This results in a angular disposition of the belt 52g as best seen in FIG. 15 where only the upper pulleys are shown for purposes of illustration. This will be appreciated as having possibilities for conceivably causing the usage of this device for moving documents in the same vertical fashion proposed previously as well as insuring more accurate engagement of the belt 52g with the documents and insuring with a downward increment of motion that the documents are kept in engagement with the edge 26a.

It would be appreciated that other embodiments will be apparent to those skilled in the art and such embodiments are contemplated within the attached claims.

I claim:

1. A differential motion translating and document drive delivery system wherein said system includes power means, first means for delivery of documents sequentially along a first path, means for establishing orientation relative to a planar reference means, and means related to said first delivery means for translating the direction of movement of said documents angularly relative to said first path along a second path said paths being generally perpendicular and hence said second path is substantially parallel relative to said reference said translating means including means having a substantially line contact with said document for controlling movement of said document, said translating means further including means for converting rotary motion along said first path to linear motion along said second path, and in addition said related means has a planetary mechanism consisting of a sun gear and at least one planetary gear, said sun gear being mounted on a hollow cylindrical member coaxially supported by bearing means on a central shaft means.

2. A system of the type claimed in claim 1 wherein said sun gear is independently supported on said bearing means and capable of free rotation relative to said shaft and planetary gear carrier means fixedly carried on said shaft and rotatable therewith.

3. A system of the type claimed in claim 2 wherein said shaft means includes means to restrain said shaft means against rotation at predetermined angular dispositions relative to said bearing support means.

4. A system of the type claimed in claim 3 wherein said shaft means carries angular disposition sensing means, said restraining means comprising clutch means intermittently controlling said shaft against angular rotation.

5. A system of the type claimed in claim 4 wherein said clutch means is electromagnetic in nature.

6. A system of the type claimed in claim 4 wherein said sensing means includes indicia display means fixed to and rotatable with said shaft and means for reading/sensing the angular disposition of said indicia means.

7. A system of the type claimed in claim 6 wherein said indicia means are circumferentially spaced openings in a disc-like means fixedly mounted on said shaft for rotation therewith and said sensing/reading means is fixedly positioned independently of but adjacent to said disc-like means and capable of discerning the presence of such an opening and signalling said restraining means for angularly positioning said shaft at a predetermined disposition.

8. A system of the type claimed in claim 6 wherein said indicia display means extends beyond the end of said shaft and includes a radially disposed diametral through bore totally traversing said indicia means as well as an imaginary extension of said shaft, said reading/sensing means being disposed diametrally on opposite sides of said through bore to sense and report to said restraining means when said bore is so disposed, said indicia means being angularly adjustable relative to said shaft.

9. A system of the type claimed in claim 7 or 8 wherein said reading/sensing means includes an energy emitter and a sensor.

10. A system of the type claimed in claim 9 wherein said energy emitter is in the visible range of the spectrum.

11. A system of the type claimed in claim 9 wherein said energy emitter is in the infra-red range of the spectrum.

12. A system of the type claimed in claim 3 wherein said planetary gear carrier means carried by said shaft means includes a first stub shaft mounted perpendicular to said shaft means and extending radially therefrom, said first stub shaft adapted to retain at least one bearing supported planetary gear in mesh with and rotatable about said sun gear, said at least one planetary gear connected to a sheave adapted to accept power transmitting means, at least one second stub shaft extending radially from said shaft means at a longitudinally spaced point from said first stub shaft and freely rotating sheave means mounted on said second stub shaft and adapted to also accept said power transmitting means.

13. A system of the type claimed in claim 1 wherein said power means is rotary power means that is connected to said hollow cylindrical member carrying said sun gear.

14. A system of the type claimed in claim 12 wherein said first and second stub shafts are substantially diametral and extend radially outwardly from opposite sides of said shaft, a planetary gear and connected sheave mounted on and adjacent each of said opposite diametral ends of said first stub shaft with said planetary gears in mesh with said sun gear, and a freely rotating sheave means mounted on each end of the oppositely extending second stub shaft and endless power means interconnecting each pair of sheaves located on a particular side of the shaft axis.

15. A system of the type claimed in claim 12 wherein said carrier means for said at least one planetary gear and sheave associated therewith are said at least one first stub shaft and said at least one first stub shaft are four in number and each said shaft being arranged to extend radially in one of the equally circumferentially spaced quadrants of said shaft, said at least one second stub shaft and associated sheave being four in number and circumferentially spaced in the same quadrant of said shaft as said carrier means, each of said planetary gears being meshed with said sun gear, and four continuous power transmitting means interconnecting said sheaves in their respective quadrants.

16. A system of the type claimed in claim 14 wherein said sun gear is constantly rotating when said rotary power is applied to its cylindrical body.

17. A system of the type claimed in claim 16 wherein when said restraining means is not activated, said shaft, said carrier means with its first stub shaft, said second stub shaft, and said continuous power transmitting means will rotate as a unit with said power transmission means being longitudinally fixed relative to said shaft and having a radial extent falling in a predetermined plane perpendicular to said bearing support means.

18. A system of the type claimed in claim 17 wherein said power transmission means are continuous flexible belts, said rotation as a unit causing said belts to form circumferentially spaced line contact means whose rotation forms a tangent with said predetermined plane whereby when said predetermined plane forms said first path said belts cause said documents to sequentially move along said first path, a planar surface perpendicular to said first path forming said means for establishing a reference orientation.

19. A system of the type claimed in claim 18 wherein said planar surface includes at least one second sensor means to detect the presence of a document located edgewise on said planar surface, said at least one second sensor means sends a signal which causes said restraining means to restrain said shaft from rotating at a predetermined angular orientation relative to said predetermined plane, said constantly rotating sun gear causing said belt to move longitudinally between said sheaves and by falling in said plane causing said document to move edgewise along said planar surface for delivery to an auxiliary operating station.

20. A system of the type claimed in claim 19 wherein gate means are provided adjacent said planar surface to control delivery of a document to said auxiliary operating station, at least one third sensor disposed adjacent said gate to determine the presence/absence of a document in that gate restrained position.

21. A system of the type claimed in claim 20 wherein the absence of a document detected by said second sensor causes said restraining means to be deactivated and said document delivery system to resume rotation as a unit and to sequentially deliver a document along said first path to reference planar surface.

22. A system of the type claimed in claim 12 wherein said planetary gear and sheave are formed as a unitary member.

23. A system of the type claimed in claim 1 wherein said first path includes two co-planar segments separated by a concave trough-like portion defining said first path, said line contact translating means moving in a circular path that has a movement about an axis parallel to the axis of said line contact and the radius of which movement falls on a path that is greater than the distance of said co-planar segments from said axis but less than the distance of the base of said trough from said axis, whereby said line contact translating means will sequentially depress a document below the co-planar segments on which the document is juxtaposed and feed it along said first path so defined.

24. A system of the type claimed in claim 23 wherein the delivery of said document edgewise to a planar surface defining said means of reference orientation activates means for causing said line contact translating means to move linearly along its axis in contact with said document to cause said document to move along said second path.

25. A system of the type claimed in claim 24 wherein said means for translating motion from rotary to linear includes a main shaft on which is mounted a differential gear means including a sun gear and at least one planetary gear connected to sheave means carrying an endless power transmitting means, secondary sheave means spaced along said main shaft and maintaining the opposite bight of said endless power transmitting means, and restraining means for preventing rotation of said main shaft while permitting continuous rotation of said sun gear to thereby activate rotation of said at least one planetary gear and resultant linear movement of said power transmitting means as it moves about said two sheaves.

26. A system of the type claimed in claim 25 wherein said main shaft carries indicia means, first sensor means for reading/sensing said indicia means and thereby determining the angular disposition of said main shaft, means connecting said sensor means to said restraining means to maintain said shaft in predetermined angular dispositions to thereby locate said power transmitting means relative to said first and second paths.

27. A system of the type claimed in claim 26 wherein said planar surface is provided with second and third sensor means, said second sensor means determining the presence/absence of a document relative to said planar surface as delivered in said first path, said planar surface also provided with a gate means for preventing linear movement of said document to ancillary operating stations, said third sensor means being activated by the presence/absence of a document adjacent to said gate means, and means for activating said linear movement upon receipt of a signal from said third sensor means.

28. A system of the type claimed in claim 12 wherein said shaft means carries a second power driven sun gear adjacent said second stub shaft, at least one planetary gear meshing with said second sun gear and mounted on said second stub shaft and connected to and restricting said previously defined free rotating sheave means, said second power driven sun gear being capable of altering the speed of said power transmitting means interconnecting said two sheaves by dragging on the power supplied to said first sun gear 29. A system of the type claimed in claim 27 wherein at least one planetary gear is removed from opposite sheaves at the two stub shafts whereby by altering the normal direction of one of said power means it is possible to provide power transmission means traveling in the same direction, whereby said device can be used as a multiple line contact delivery means for feeding documents off the tope of a stack of documents.

30. A system of the type claimed in claim 12 wherein said shaft means is formed in at least portions divided intermediate its extremities but rotatable interconnected whereby said first and second stub shafts can be angularly disposed relative to one another, whereby said power transmitting means extending between said two sheaves will be angularly disposed relative to the axis of said shaft and thereby will provide an angular moment to the forces transmitted to a document engaged thereby.

* * * * *